US008131102B2

(12) United States Patent
Albiez et al.

(10) Patent No.: US 8,131,102 B2
(45) Date of Patent: Mar. 6, 2012

(54) METHOD FOR PROCESSING A DIGITAL GRAY VALUE IMAGE SO THAT A REDUCED IMAGE NOISE AND SIMULTANEOUSLY A HIGHER IMAGE SHARPNESS IS ACHIEVED

(75) Inventors: Michael Albiez, Aalen (DE); Armin Hayn, Saffron Walden (GB); Owain Evans, Cambridge (GB)

(73) Assignee: Carl Zeiss NTS GmbH, Oberkochen (DE)

( * ) Notice: Subject to any disclaimer, the term of this patent is extended or adjusted under 35 U.S.C. 154(b) by 1190 days.

(21) Appl. No.: 11/808,282

(22) Filed: Jun. 8, 2007

(65) Prior Publication Data

US 2008/0013853 A1    Jan. 17, 2008

(30) Foreign Application Priority Data

Jun. 9, 2006   (DE) .................. 10 2006 026 843

(51) Int. Cl.
*G06K 9/40* (2006.01)

(52) U.S. Cl. ........ 382/266; 382/195; 382/199; 382/181; 382/237

(58) Field of Classification Search ................ None
See application file for complete search history.

(56) References Cited

U.S. PATENT DOCUMENTS

| 5,563,962 | A | * | 10/1996 | Peters et al. | 382/261 |
| 5,592,571 | A | * | 1/1997 | Peters | 382/261 |
| 5,662,113 | A | | 9/1997 | Liu | |
| 5,715,334 | A | * | 2/1998 | Peters | 382/254 |
| 6,757,442 | B1 | | 6/2004 | Avinash | |
| 2003/0026495 | A1 | | 2/2003 | Gondek et al. | |

OTHER PUBLICATIONS

Wang. et al, "Threshold selection by clustering gray levels of boundary", 2003, Pattern Recognition Letters, pp. 1983-1999, 24, Elsevier Science B.V.*
Charette et al, "Development and Integration of a Micro-Computer based Image Analysis System for Automatic PCB Inspection", 1988, IEEE, pp. 129 to 135.*
Fu et al. "Feature Preserving Nonlinear Diffusion for Ultrasonic Image Denoising and Edge Enhancement World Academy of Science", 2005, Engineering and Technology, pp. 148-151.*
Chen et al. "A Morphological Edge Detector for Gray-Level Image Thresholding", 2005, ICIAR 2005, LNCS 3656, pp. 659-666.*
Fu et al. "A Compound Anisotropic Diffusion for Ultrasonic Image Denoising and Edge Enhancement", 2005, IEEE.*
Nalwa, V.S. et al, "On Detecting Edges", IEEE Transactions on Pattern Analysis and Machine Intelligence, vol. PAMI-8, No. 6, Nov. 1986, pp. 619-714.
Wang, Q. et al, "Contrast Enhancement for Enlarged Images Based on Edge Sharpening", Proceedings of the IEEE International Conference on Image Processing, vol. 2, 2005, pp. 11-762 to 11-765.
Translation of German Office Action dated Jul. 23, 2010 in parallel German application.
European Search Report dated Nov. 19, 2008 in parallel European application.

* cited by examiner

*Primary Examiner* — Sath V Perungavoor
*Assistant Examiner* — Jason Heidemann
(74) *Attorney, Agent, or Firm* — Walter Ottesen

(57) ABSTRACT

A method for processing a digital gray value image includes the steps of: generating a binary edge image from the gray value image so that edges present in the gray value image are determined as line areas around the edges; applying a sharpness algorithm in the gray value image within regions which correspond to the line areas; and, carrying out a smoothing process in the gray value image within regions which lie outside of the line areas so that an additional smoothed, sharpened gray value image is generated.

13 Claims, 16 Drawing Sheets

25  26  27  28  29

30

METHOD FOR PROCESSING A DIGITAL GRAY VALUE IMAGE SO THAT A REDUCED IMAGE NOISE AND SIMULTANEOUSLY A HIGHER IMAGE SHARPNESS IS ACHIEVED

CROSS REFERENCE TO RELATED APPLICATION

This application claims priority of German patent application no. 10 2006 026 843.1, filed Jun. 9, 2006, the entire content of which is incorporated herein by reference.

FIELD OF THE INVENTION

The invention relates to a method for processing a digital gray value image. The invention further relates to a computer system and a computer program for carrying out such a method as well as an image recording arrangement operating with a computer program of this kind.

BACKGROUND OF THE INVENTION

A digitally recorded gray value image contains image data which are shown in different gray values. If such images are formed, for example, by means of an electron microscope, an electron beam scans line by line over the specimen area to be investigated. If this is done at high speed, then noise or a granulation arise which clearly and disturbingly are superposed on the actual image data. An image recorded in such a manner can only be detected with difficulty and with great relative uncertainty by a viewer. If an electron beam is guided over the specimen at a very slow speed, then image elements can only be imaged unsharply or blurred because mechanical and electronic disturbances become effective in an amplified manner because of a long integration time per image point. Recordings of this kind can be improved with a digital image reprocessing, for example, via a noise filter, so that the ratio of signal to noise is increased. In this way, gray values of neighboring pixels are often summed and averaged. While the noise is reduced thereby, the resolution of the image deteriorates. This relationship can, in principle, not be avoided by using a noise filter.

SUMMARY OF THE INVENTION

It is an object of the invention to provide a method with which a digital gray value image can be so processed that a reduced image noise and simultaneously a higher image sharpness is achieved.

The method of the invention is for processing a digital gray value image. The method includes the steps of: generating a binary edge image from the gray value image so that edges present in the gray value image are determined as line areas around the edges; applying a sharpness algorithm in the gray value image within regions which correspond to the line areas; and, carrying out a smoothing process in the gray value image within regions which lie outside of the line areas so that an additional smoothed, sharpened gray value image is generated.

With the method according to the invention, a binary edge image is so generated from a recorded gray value image that edges present in the gray value image are determined as a line area extending around an edge. Thereafter, a sharpness algorithm is utilized in the gray value image within regions which correspond to the line area around an edge. Within regions which lie outside of the line areas around edges in the gray value image, a smoothing method is carried out so that overall an additional smoothed and sharpened gray value image is generated. A noise suppression filter, with which the entire image is processed, is not used. Rather, a noise suppression is only undertaken in regions which were not identified as edges. In this way, a noise suppression takes place only in the regions which exhibit a small gradient in the gray value between image points which are mutually adjacent. If a high gray value gradient is present in one region which permits the conclusion to be drawn as to the presence of an edge, a sharpness algorithm is used so that, in this region, a higher sharpness is achieved. In this way, a selective filtering is achieved with the method of the invention. The principal problem when utilizing a noise suppression filter for the entire image is that the noise is reduced but the resolution of the image is deteriorated. This problem can be avoided with the method of the invention.

According to a preferred embodiment, with the sharpness algorithm, gray values within the regions, which correspond to the line areas around edges, are computed utilizing a tangent hyperbolic function. Such a function is especially applicable to recordings which are made by means of an electron beam. An electron beam which is guided over a sharp object edge generates an edge course in the image to be built up which can be described very well via a tangent hyperbolic function. Preferably, the computation of an image which is to be built up for the gray value matrix is done with the following equation:

$$If = A^* \tan h(m^* ar \tan h[\{I0-C\}/A]) + C,$$

wherein:
If=gray value matrix of the sharpened gray value image having gray values within the line areas around edges;
I0=gray value matrix of the unprocessed gray value image;
A=amplitude of a tangent hyperbolic function which indicates the gray value course in the unprocessed gray value image within the regions which correspond to the line areas around edges;
C=gray value at the inflection point of the tangent hyperbolic function which indicates the gray value course in the unprocessed gray value image within the regions which correspond to the line areas around edges; and,
m=sharpening factor.

According to an embodiment of the invention, the binary edge image is created via a gradient image generated on the basis of the gray value image. For generating the gradient image, preferably a difference operator is utilized which is selected from the group comprising: a Sobel operator, a Prewitt operator, a Laplace operator, a Kirsch operator and a Roberts operator. Other difference operators can be utilized if a gradient image can be generated therewith. Preferably, the gray value image is subjected to a smoothing process in advance of the generation of the gradient image. This can, for example, take place with the use of a median filter. A smoothing process of this kind functions to reduce the noise intensity in the originally recorded gray value image.

According to a preferred embodiment of the invention, the gradient image is generated by coupling a first directional gradient image with a second directional gradient image. The first directional gradient image is created in that gradients in the gray value image are determined in a first direction and the second directional gradient image is created in that gradients in the gray value image are determined in a direction perpendicular to the first direction. A procedure of this kind is advantageous, for example, with the use of a Sobel operator. With a gradient determination of this kind, the direction of the gradients can be detected at edges to be identified. This is advantageous because line areas around edges with closed paths can be determined. When such paths are determined, then the threshold value for the binarization as mean value of gray values of the gray value image can be computed in the line areas around edges.

If closed paths are not sought so that, for example, also half circles can be determined, a first threshold value can be assigned to the gradient image. Gradient image points with a brightness magnitude above the first threshold value are set to logic 1 and gradient image points having a brightness magnitude below the first threshold value are set to logic 0 so that a binary edge image is generated wherein the gradient image points, which are set to logic 1, form line areas around edges and the gradient image points, which are set to logic 0, form a background. In this way, a binary edge image with line areas around edges is created on a black background. The first threshold value amounts to preferably a fourth of the maximum gradient in the gradient image. Such a relatively low threshold value is advantageous because, in this way, only a relatively small amount of image data is masked out from the gradient image present as a gray value image.

In the event that a further reduction of noise signals is wanted, the binary edge image can be subjected to a smoothing process so that a smoothed binary edge image is generated. Thereafter, a second threshold value is set and the image points with a brightness magnitude above the second threshold value are set to logic 1 and image points having a brightness magnitude below the second threshold value are set to logic 0. The edge image points, which are set to logic 1, form line areas around edges and the edge image points, which are set to logic 0, form a background in order to generate an additional binary edge image. Preferably, the second threshold value amounts to half of the maximum gradient in the smoothed binary edge image. Since the basis is a binary image, this relatively high threshold value can be used without masking out important image data.

BRIEF DESCRIPTION OF THE DRAWINGS

The invention will now be described with reference to the drawings wherein.

DESCRIPTION OF THE PREFERRED EMBODIMENTS OF THE INVENTION

Figure 15:
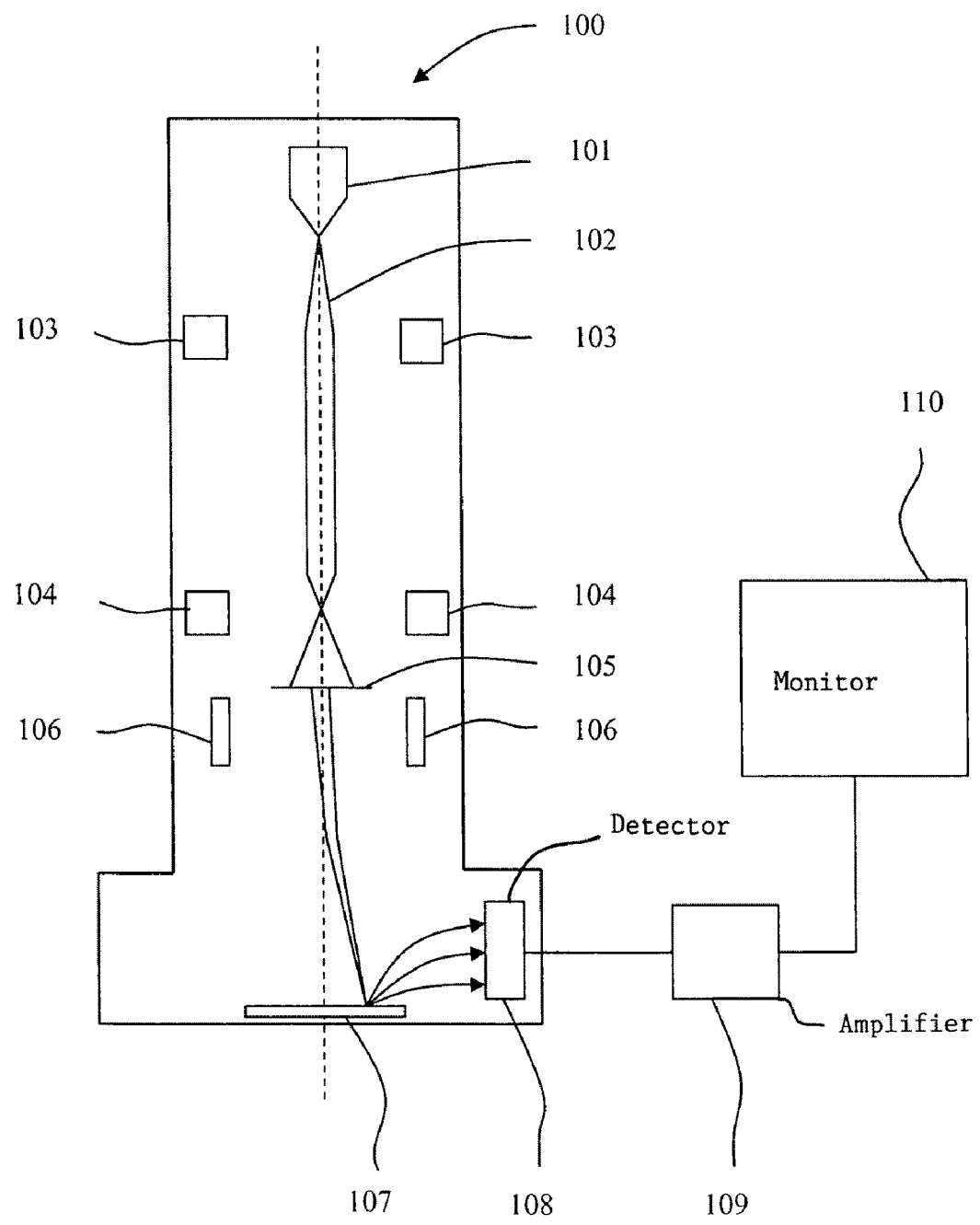

A raster electron microscope 100 having a monitor 110 is shown in FIG. 15. The monitor can display a gray value image. The raster electron microscope 100 includes an electron source 101 which can emit an electron beam 102 which is focused by electromagnetic lenses 103 and 104. After passing an aperture diaphragm 105, the electron beam is deflected by deflecting coils 106 onto a specimen 107, which is to be investigated, and is passed linearly in a raster manner over the surface of the specimen. When the electron beam impinges upon the specimen, secondary electrons are, inter alia, liberated and these secondary electrons are detected by a detector 108. The signals of the detector are conducted to a downstream amplifier 109 to which the monitor 110 is coupled and with which a gray value image can be displayed.

Figure 1:
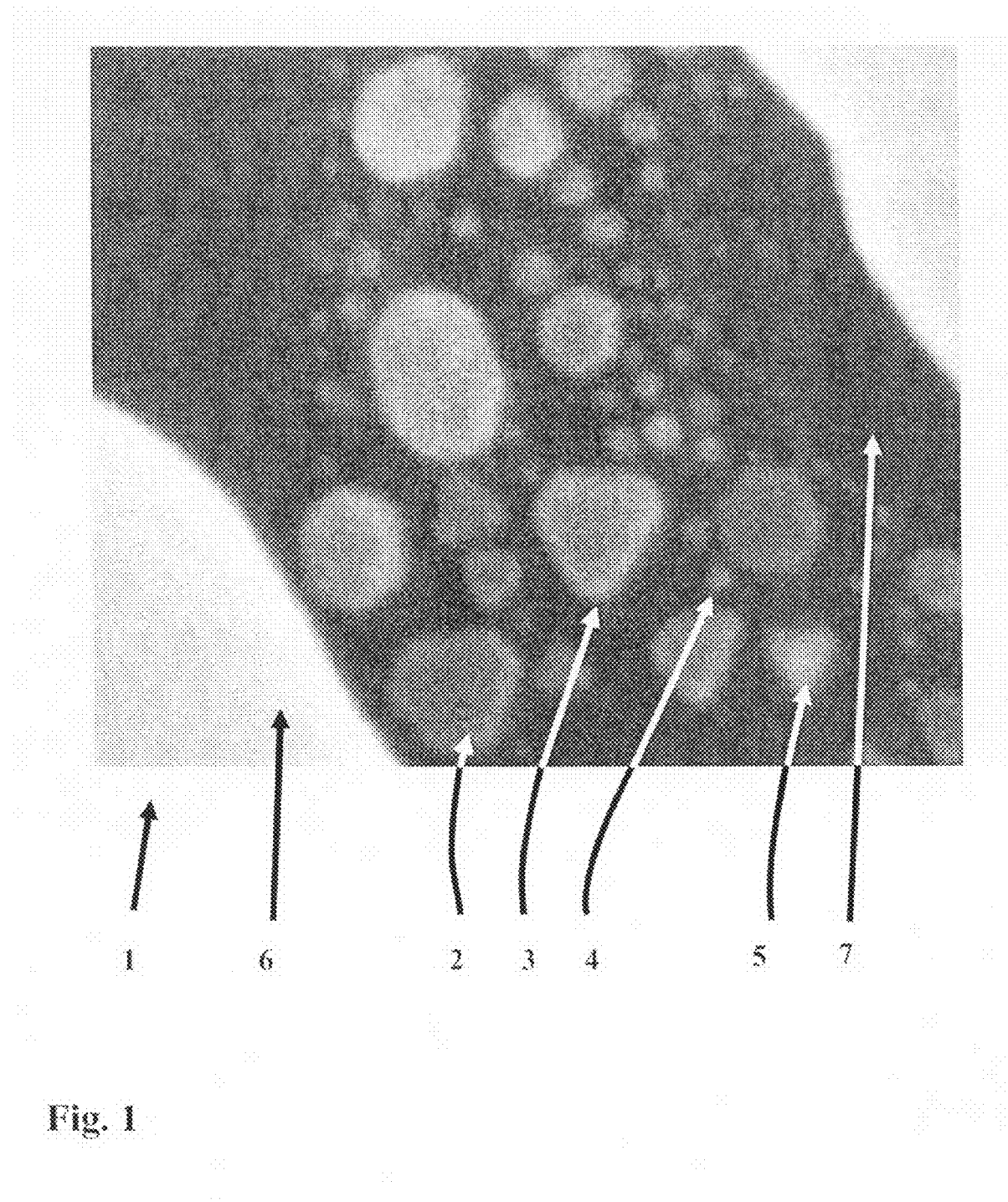
FIG. 1 is a recorded digital gray value image having a high noise content.
Figure 13A:
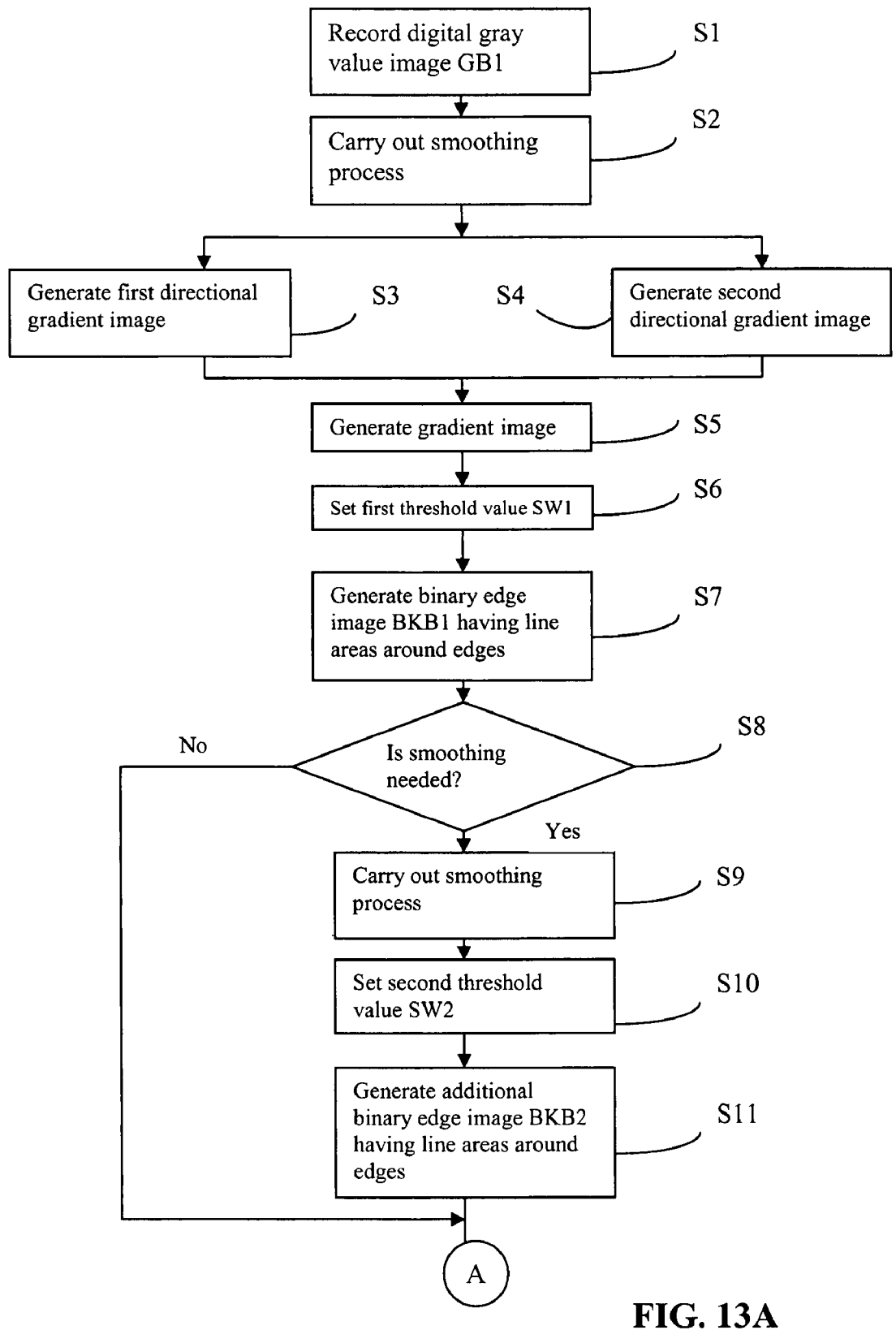
FIG. 13A is a flow diagram showing the most important steps of the method of the invention.

In FIG. 1, a digital gray value image 1 is shown which is recorded with a raster electron microscope (see step S1 in the flow diagram of FIG. 13A). The digital gray value image in FIG. 1 shows relatively bright circularly-shaped and multi-cornered objects (2, 3, 4) in different sizes on a darker appearing background 7. The objects (2, 3, 4) are shown in different shades of gray. In part, the objects have a brighter border region 5 when compared to their centers so that the objects are easily recognizable for the human eye on the dark background 7. In the recording, relatively bright regions 6 are detectable compared to the objects (2, 3, 4) and these bright regions assume a large image area.

Figure 4:
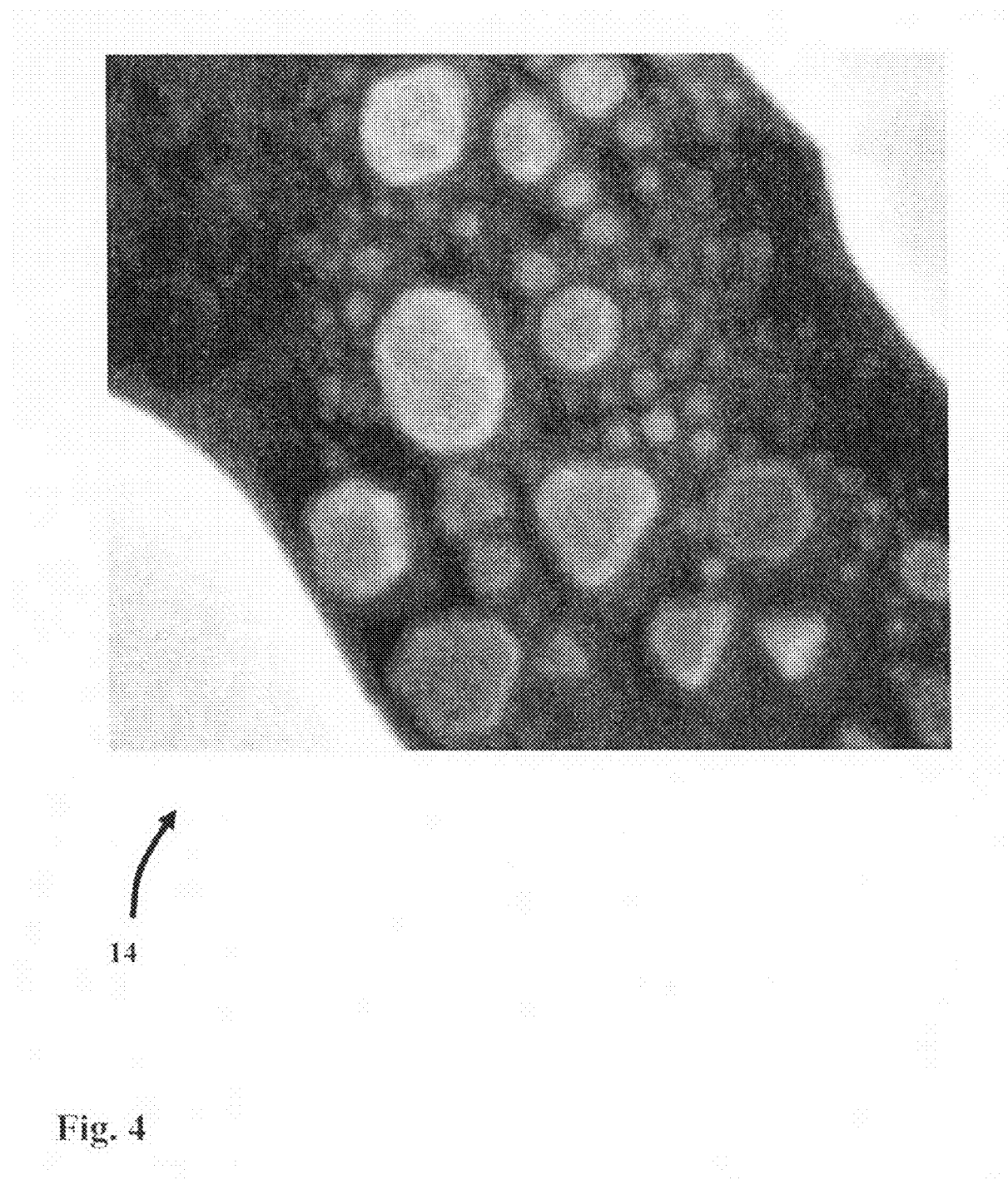
FIG. 4 is a gray value image smoothed globally on the basis of the gray value image of FIG. 1.

According to the invention, the image processing takes place in such a manner that, at first, a binary edge image is generated in order to there determine a line area extending around an edge. For this purpose, the gray value image recorded in step S1 is, in step S2, subjected to a smoothing process over its entire surface (global) so that a smoothed gray value image 14 is present as shown in FIG. 4. This can be carried out, for example, with a 3×3 median filter. The smoothed gray value image 14 shows reduced noise signals compared to the gray value image 1.

Figure 5:
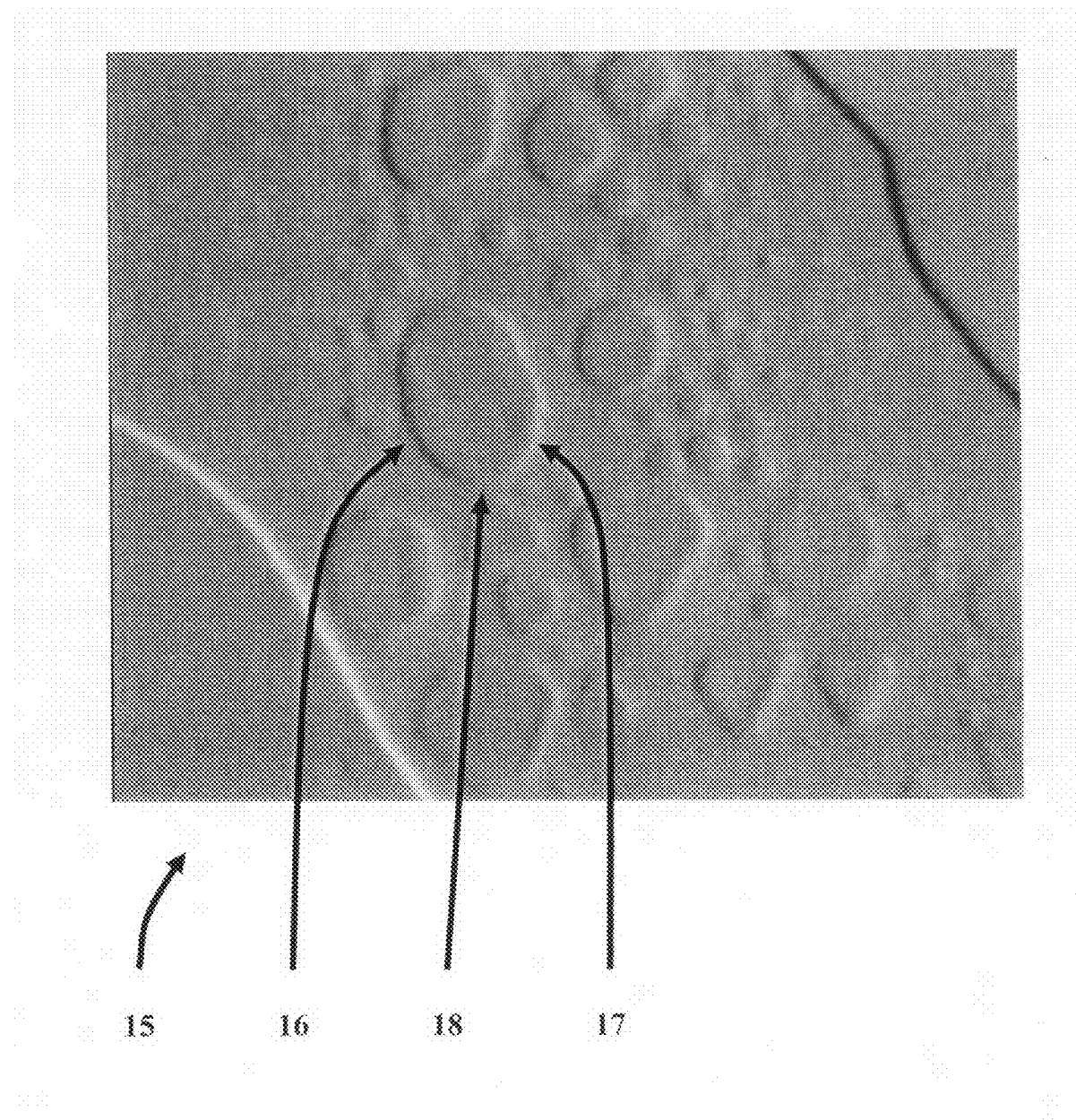
FIG. 5 is a first directional gradient image on the basis of the smoothed gray value image of FIG. 4.

Thereafter, a first directional gradient image can be generated in step S3. In the first directional gradient image 15 shown in FIG. 5, a gradient is determined in line direction for each point line based on the smoothed gray value image 14. At the edges, which are present in line direction, darker or brighter lines result as shown by reference numerals 16 and 17 in FIG. 5. If, during scanning in the line direction (x-direction), no gradient is detected, an average gray value appears which is not distinguishable by a brighter or darker line from the surroundings (see reference numeral 18). In a further step S4, the procedure for determining a gradient is carried out also in the column direction (y-direction) on the basis of the smoothed gray value image 14.

Figure 6:
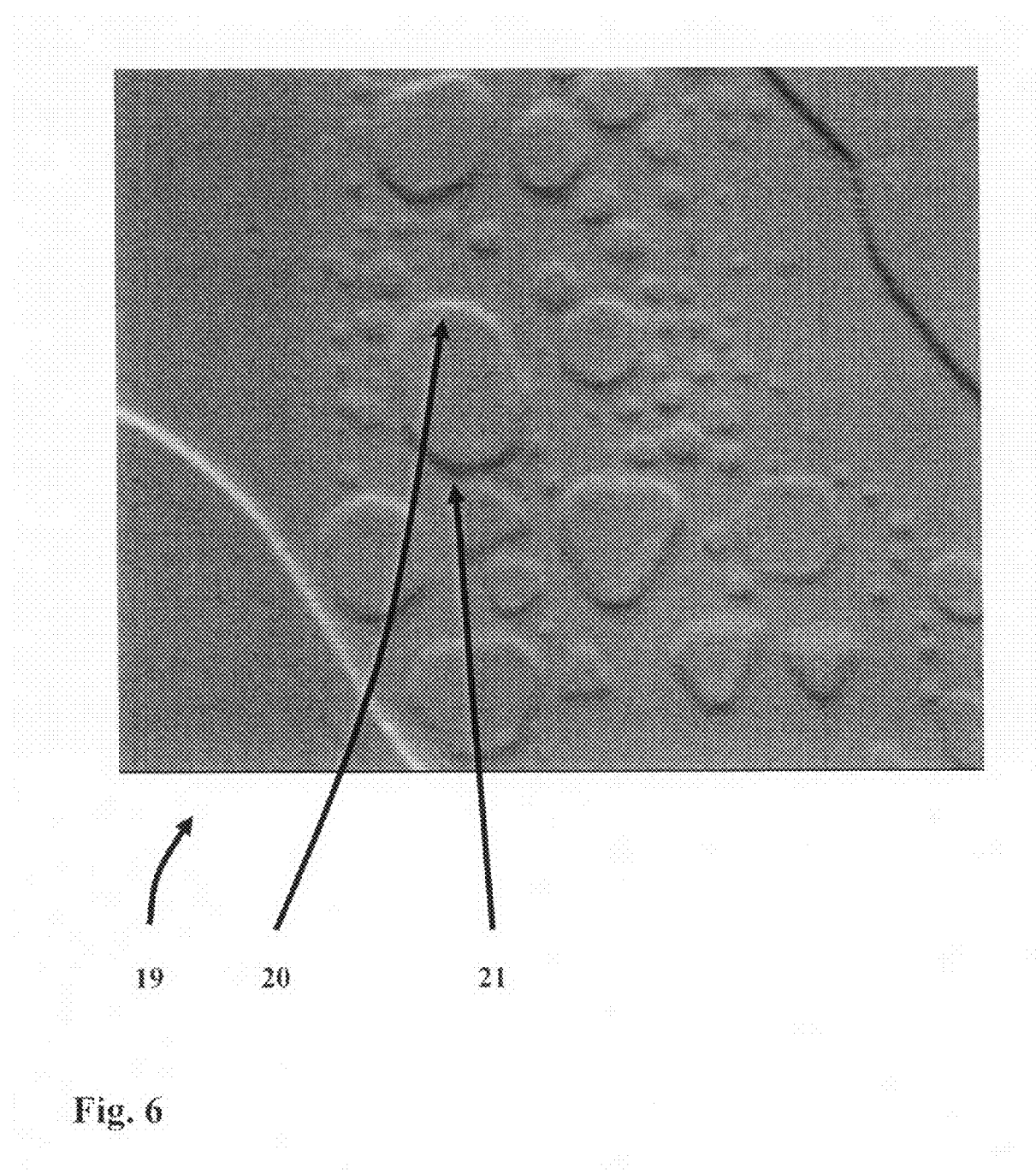
FIG. 6 is a second directional gradient image on the basis of the smoothed gray value image of FIG. 4.
Figure 7:
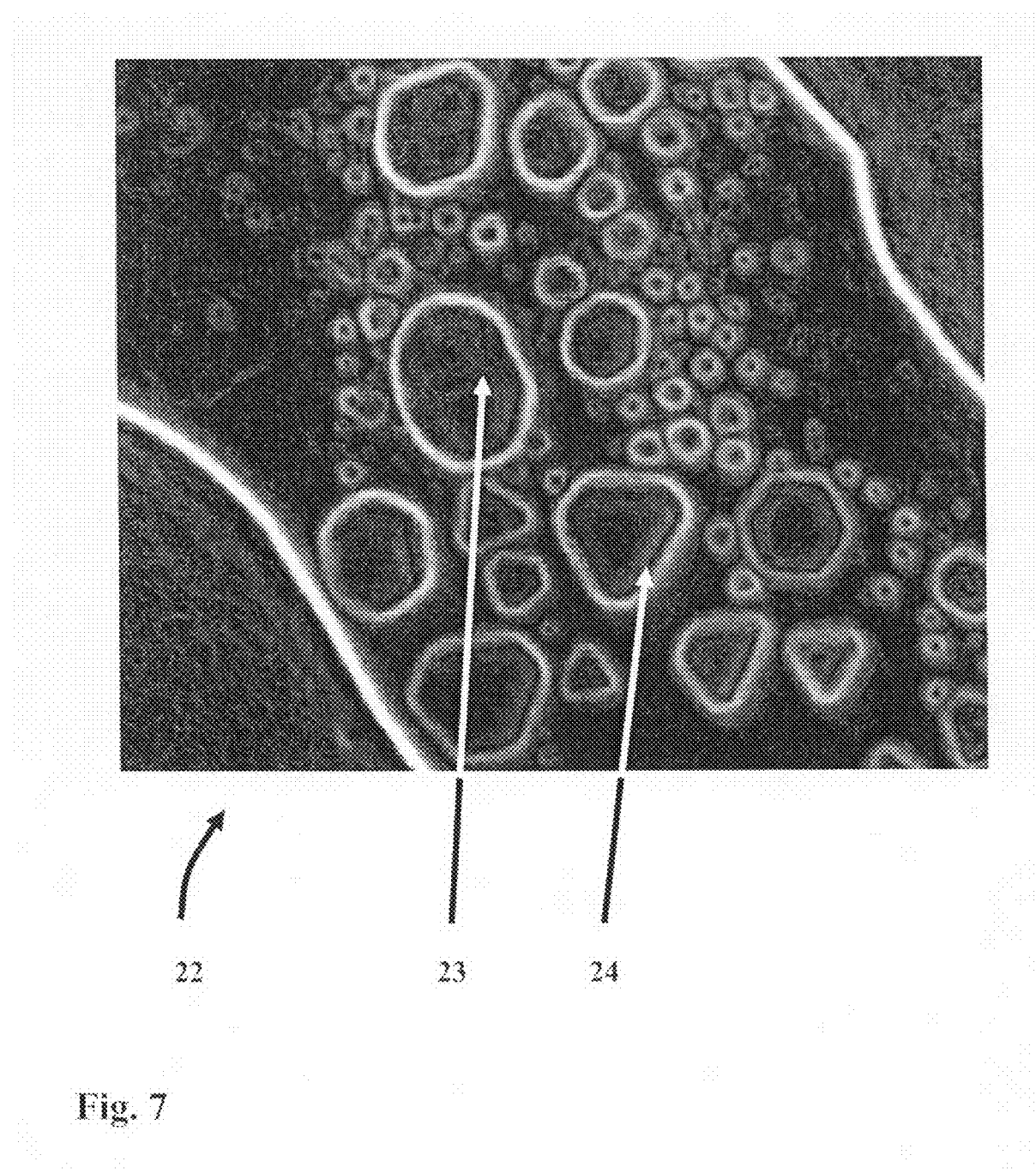
FIG. 7 is a gradient image because of a coupling of the first and second directional gradient images of FIGS. 5 and 6.

FIG. 6 shows a second directional gradient image 19 and, for each point column, a gradient was determined in column direction. From FIG. 6, it can be detected that, for example, a brighter line 20 and a darker line 21 result at the edge of an object edge in the y-direction. When the two directional gradient images 15 and 19 are coupled to each other (step S5), for example, by squaring the particular gray value of each image point of the first directional gradient image 15 and of the second directional gradient image 19 and by thereafter adding the squares for each image point, then there results the gradient image 22 shown in FIG. 7. Of the objects present, primarily the outlines in the regions of their edges can be detected. In addition, somewhat darker regions (23, 24) can be seen within the objects on a still darker background.

Figure 8:
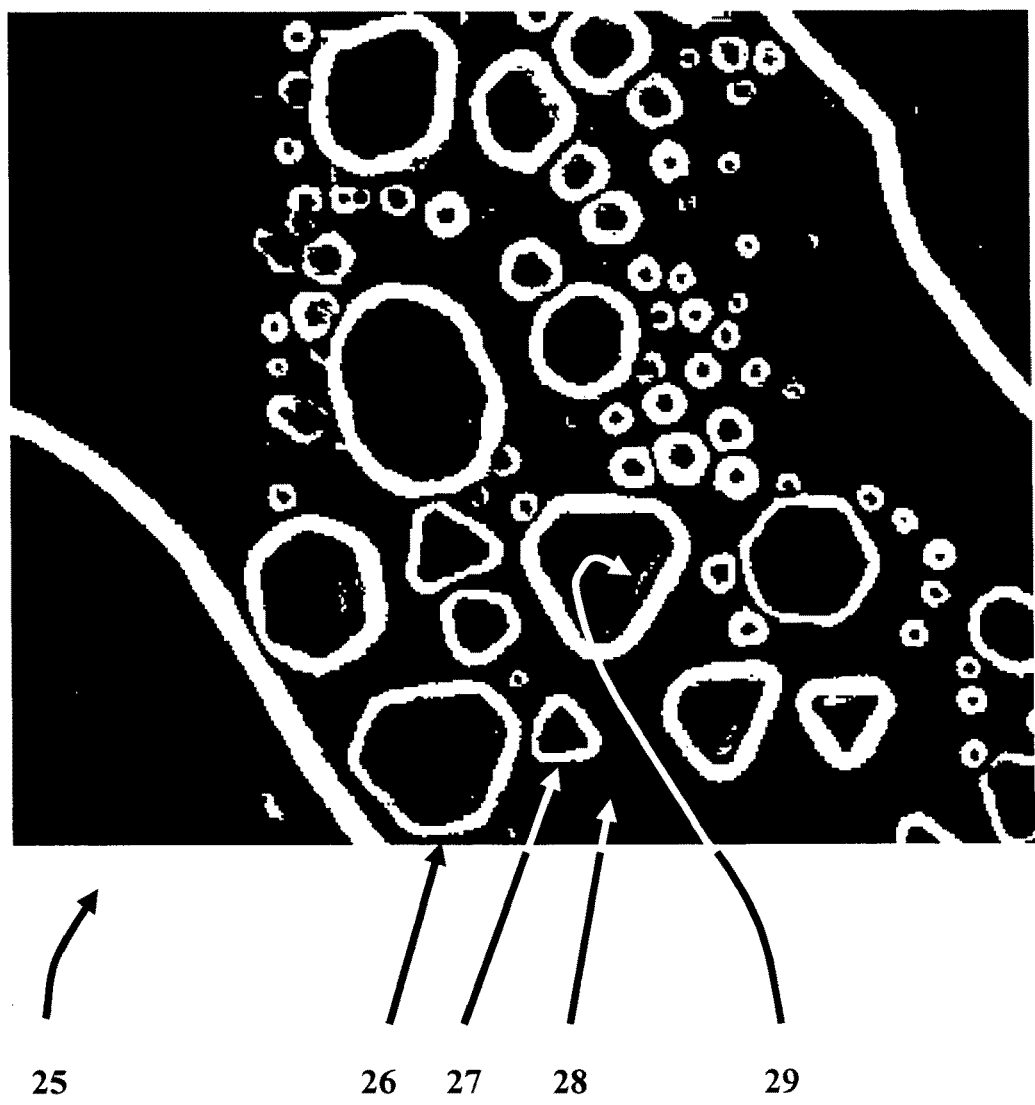
FIG. 8 is a binary edge image having line areas around edges on the basis of the gradient image of FIG. 7.

In step S6, a first threshold value SW1 is set, for example, a quarter of the maximum gradient in the gradient image 22. Gradient image points having a brightness magnitude above the first threshold value are set to logic 1 in an image which is to be newly established. Gradient image points having a brightness magnitude below the first threshold value SW1 are set to logic 0 (step S8). In this way, a binary edge image 25 is provided (see FIG. 8) wherein the image points, which are set to logic 1, form a line area around an edge (see, for example, reference numerals 26 and 27) and the image points, which are set to logic 0, form a background (see, for example, reference numeral 28).

Figure 9:
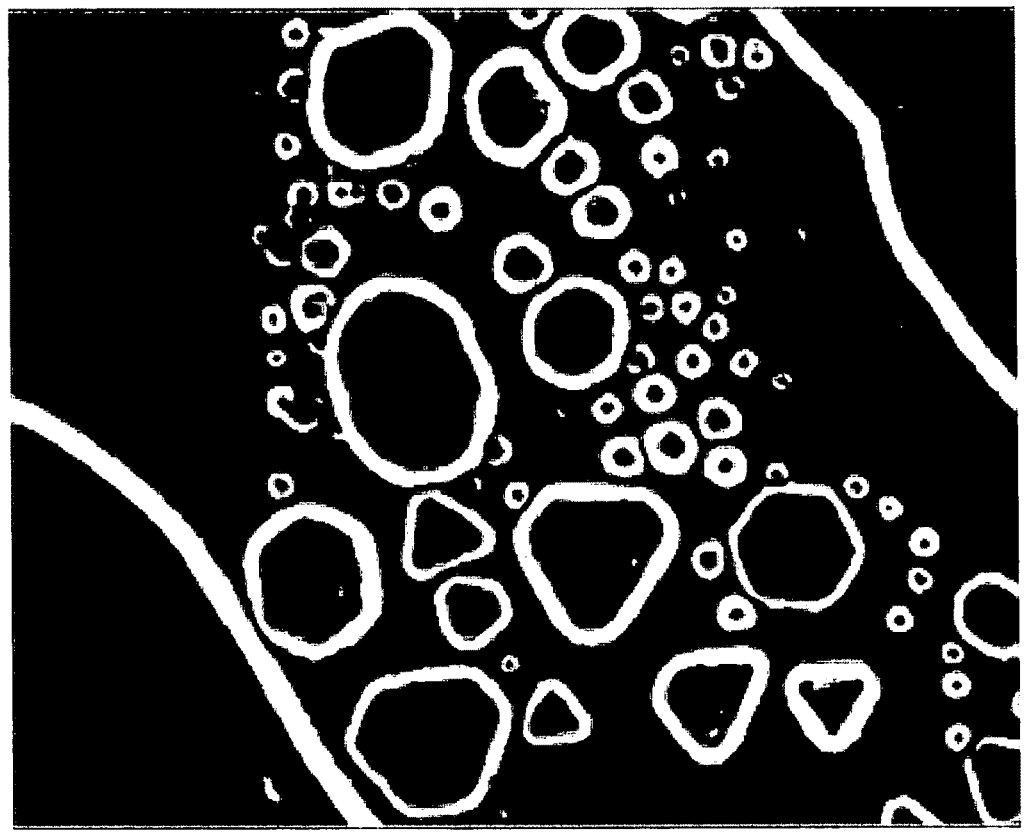
FIG. 9 is a globally smoothed binary edge image on the basis of the binary edge image of FIG. 8.
Figure 9:
Figure 10:
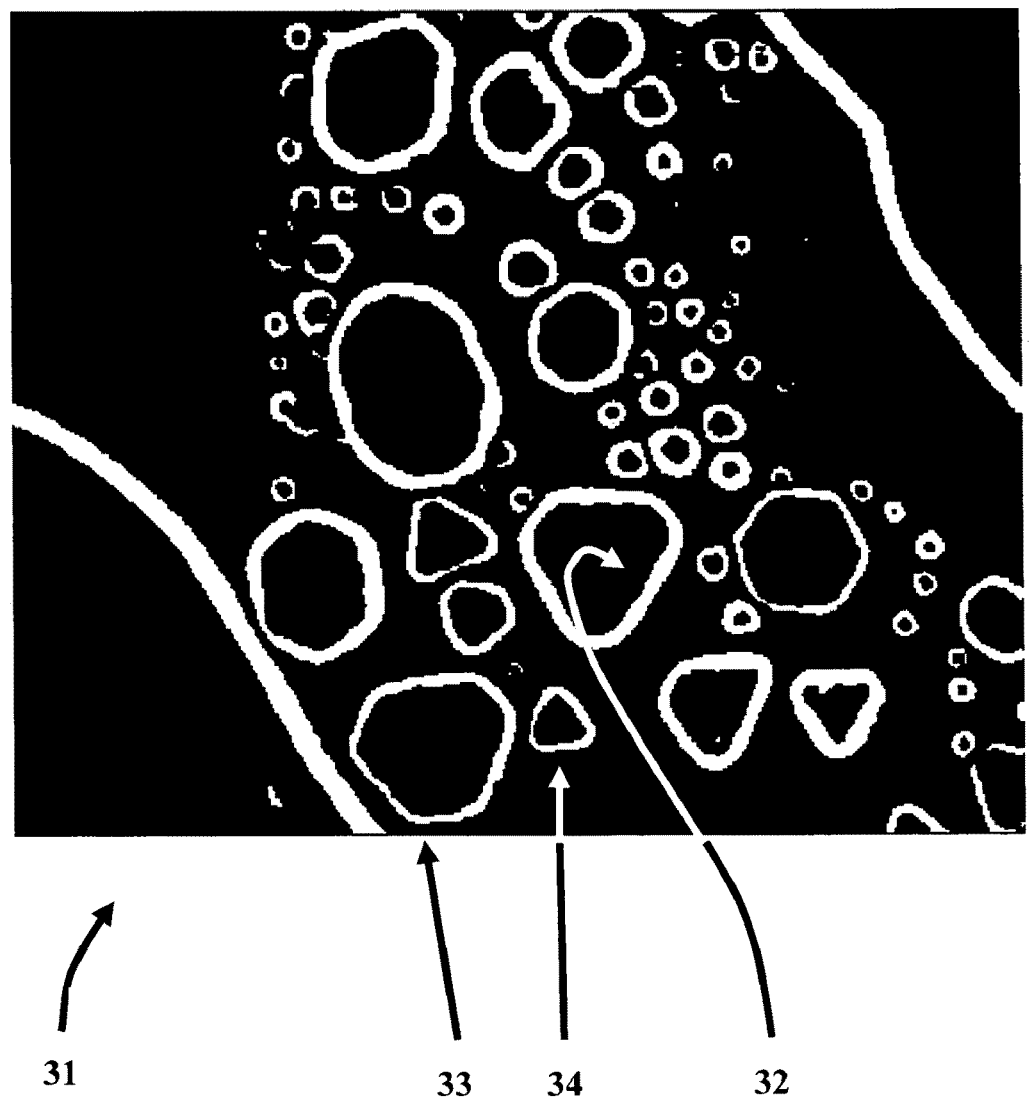
FIG. 10 is an additional binary edge image having line areas around edges on the basis of the image of FIG. 9.

In the event that signals are still present in the binary edge image 25 which are interpreted as being noise (step S8) (see, for example, reference numeral 29 in FIG. 8), a further smoothing process can be carried out (step S9) for the entire image (global). In this way, a smoothed binary edge image 30 is obtained as shown in FIG. 9. Thereafter, a second threshold value SW2 is set, for example, half of the maximum gradient in the binary edge image 25 (step S10). Image points having a brightness magnitude above the second threshold value are set to logic 1 and image points having a brightness magnitude below the second threshold value SW2 are set to logic 0. The edge image points, which are set to logic 1, form a line area around an edge while the edge image points, which are set to logic 0, form a background. In this way, an additional binary edge image 31 having a line area around an edge (step S11, see also FIG. 10) is obtained. The noise identified in FIG. 8 (see reference numeral 29) is reduced in the additional binary edge image 31 or is no longer present (see reference numeral 32). It is noted that the steps S9 to S11 are optional and can be omitted when, in the binary edge image 25 according to FIG. 8, no noise signals are identified. On the other hand, it is understood that the inquiry of step S8 can be answered automatically with "yes" so that a global smoothing process is always carried out independently of the result of step S7.

According to the invention, a sharpness algorithm is applied (step S12) in the originally recorded gray value image within regions which correspond to the line areas around edges. The principle comprises, within these areas, to approximate gray value courses utilizing a tangent hyperbolic function. This can be explained as follows: at the transition from the relatively dark image background to an object edge and from there to a relatively bright inner region of the object, the brightness or the gray value increases. If it is assumed that this transition is present stepwise in an infinitely sharp edge, then this can, however, not be reproduced as such an infinitely sharp edge when rastering by means of an electron beam. The reason is that a focused electron beam has an intensity distribution which is similar to a two-dimensional Gauss distribution curve. If such an electron beam is guided over a sharp edge, an edge profile results which can generally be described by a tangent hyperbolic function.

Figure 2A:
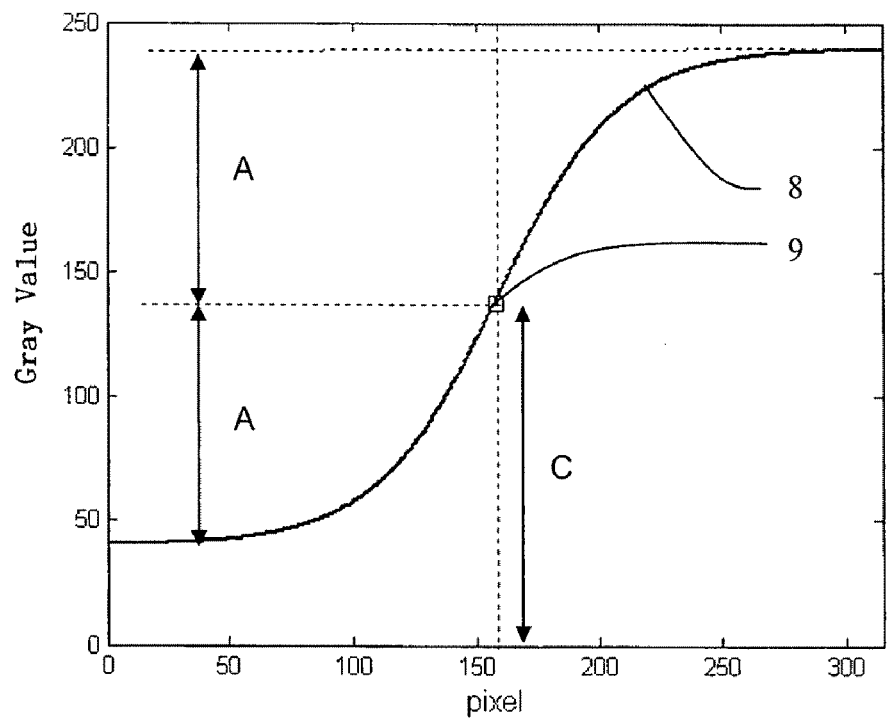
FIG. 2A is a diagram showing a gray value course along an object edge in the gray value image in advance of utilizing a sharpness algorithm.

This is shown schematically in the diagram of FIG. 2A. A curve 8 shows the gray value course as a function of image points (pixels). For a lower pixel number, the curve exhibits a low gray value and for a higher pixel number, the curve exhibits a high gray value. At a low pixel number, for example, 0 to 50, one can assume a dark image background whereas, for a high pixel number, such as starting at 280, a bright object is present. The edge between background and object assumes a width from the pixel number 50 to the pixel number 280. By means of a sharpness algorithm, the width of the curve course can be significantly reduced.

Figure 11:
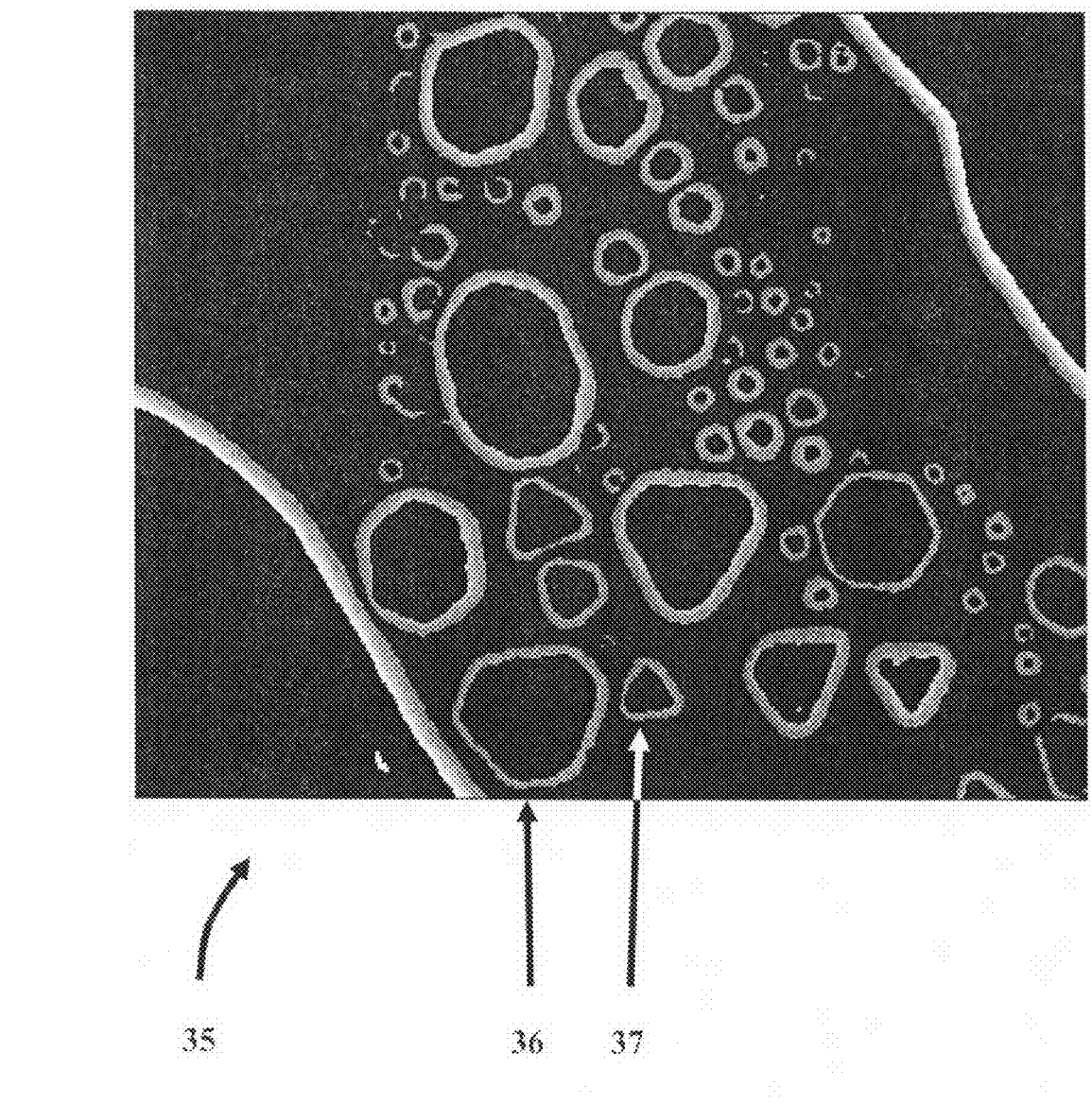
FIG. 11 is a superposition of the original gray value image of FIG. 1 with the additional binary edge image of FIG. 10.
Figure 14:
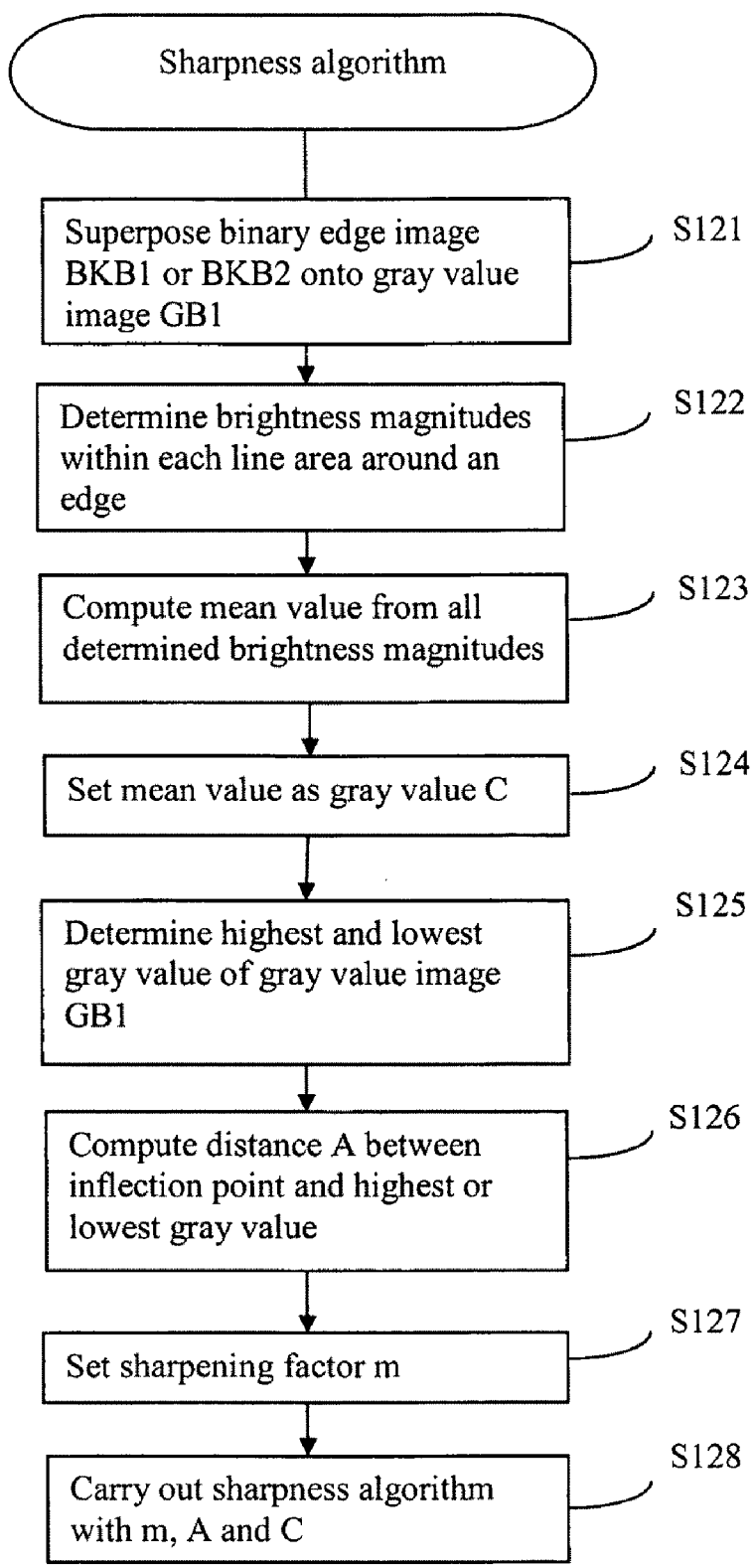
FIG. 14 is a flow diagram showing the most important steps of a sharpness algorithm according to the invention; and, FIG. 15 is a schematic cross-sectional view of an electron microscope having a monitor.

According to an embodiment of the invention, it is first necessary to determine an inflection point 9 from the curve 8. In step S121 (see FIG. 14), the gray value image 1 and the binary edge image 25 (or the additional binary edge image 31) are superposed. FIG. 11 shows such a superposed image 35 from which it is apparent that the line areas around edges shown in white (see, for example, reference numerals 33, 34 in FIG. 10) are filled out with gray values of the gray value image 1 (see also reference numerals 36 and 37). Thereafter, in step S122, the brightness magnitudes within each line area around an edge are determined in the entire image 35. From all brightness magnitudes so determined, the mean value is computed (step S123). This mean value is set (step S124) as gray value C of the inflection point 9 (see FIG. 2A). This procedure, referred to the entire image, is sufficient when an essentially uniform gray value distribution is present in the gray value image 1. In gray value images having very non-homogeneous intensity distributions, it is necessary to limit this determination of the gray value C to individual sectors and to carry out the computation for each sector individually. The gray value C at the inflection point 9 can, however, also be determined in another manner, for example, via: minimal gray value in the image+(maximum gray value−minimum gray value)/2.

After the determination of the inflection point 9, the distance A between the inflection point 9 and a highest or lowest gray value of curve 8 is determined. For this purpose, in step S125, the highest and lowest gray value can be determined from the gray value image GB1 and, thereafter, the distance A between inflection point 9 and highest or lowest gray value can be computed in step S126. The computation of A can also take place locally in the event that intense inhomogeneities are present in the image. It is noted that the method for determining A is not limited to the above-described manner but can also be carried out otherwise.

Figure 2B:
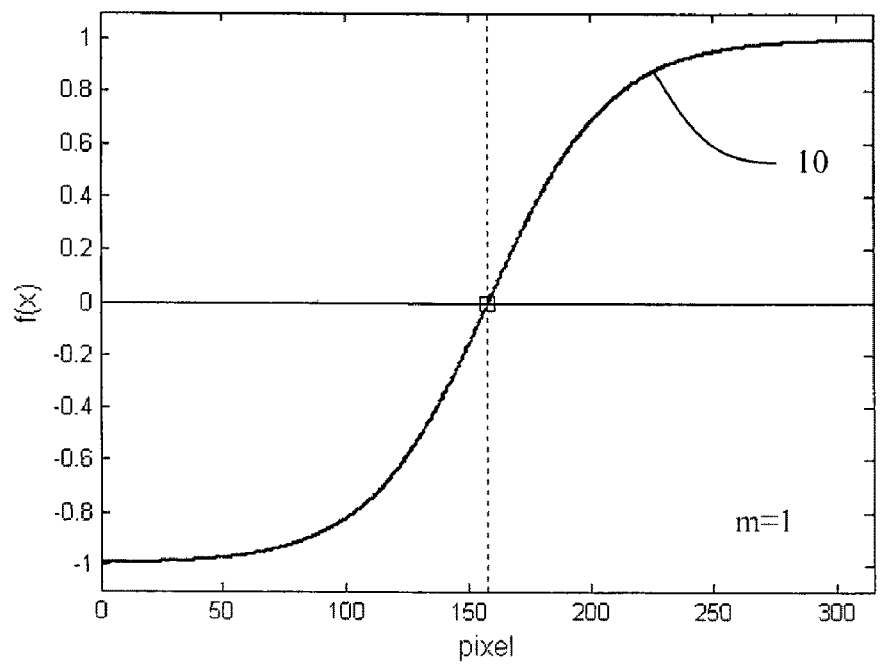
FIG. 2B is a diagram showing a tangent hyperbolic function which corresponds to the gray value course of the curve shown in FIG. 2A.

To transform the curve 8 to a tangent hyperbolic function, the inflection point must be so placed in a coordinate system that it runs through the abscissa of the coordinate system. This takes place in such a manner that, in each case, the gray value C of the inflection point is subtracted from the gray values of the curve 8 (described by the gray value matrix I0 for the entire gray value image). In addition, the amplitude A of the curve 8 must be normalized to the quantity 1 for the transformation into a tangent hyperbolic function. The corrected gray values I0-C are divided for this purpose by amplitude A. The result is a curve 10 (see FIG. 2B). This curve has the same slope as the curve 8 and, in this case, the sharpness factor is m=1.

Figure 2C:
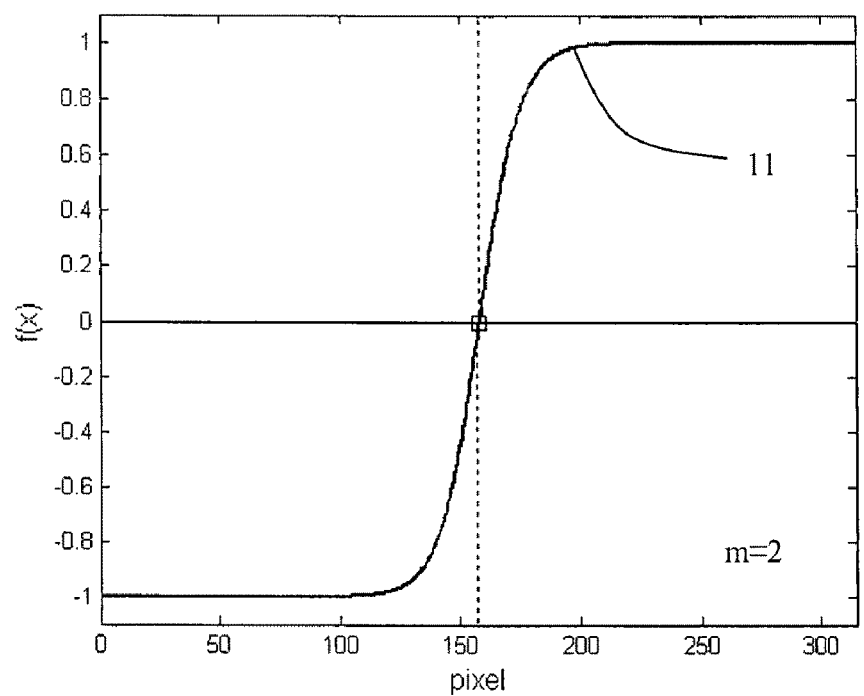
FIG. 2C is a diagram of a tangent hyperbolic function which corresponds to the curve shown in FIG. 2B and has a steeper slope.

The width of the tangent hyperbolic function can be reduced in that the argument of the tangent hyperbolic function is multiplied by a factor m>1 which must be set in step S127. FIG. 2C shows a sharpened curve 11 "sharpened" by the sharpness factor m=2. The gray value course If of a sharpened curve of a gray value image with the original gray value I0 can be computed starting from a tangent hyperbolic function having amplitude A and gray value C of the inflection point in accordance with the following equation:

$$If = A * \tan h(m * ar \tan h[\{I0-C\}/A]) + C \qquad (1)$$

To ensure that, for the computation of the area tangent hyperbolic based on divergence for −1 and +1, the values always lie within this value range, it must be achieved that the quantity of the term [{I0−C}/A] is less than 1 for all pixels.

Figure 3:
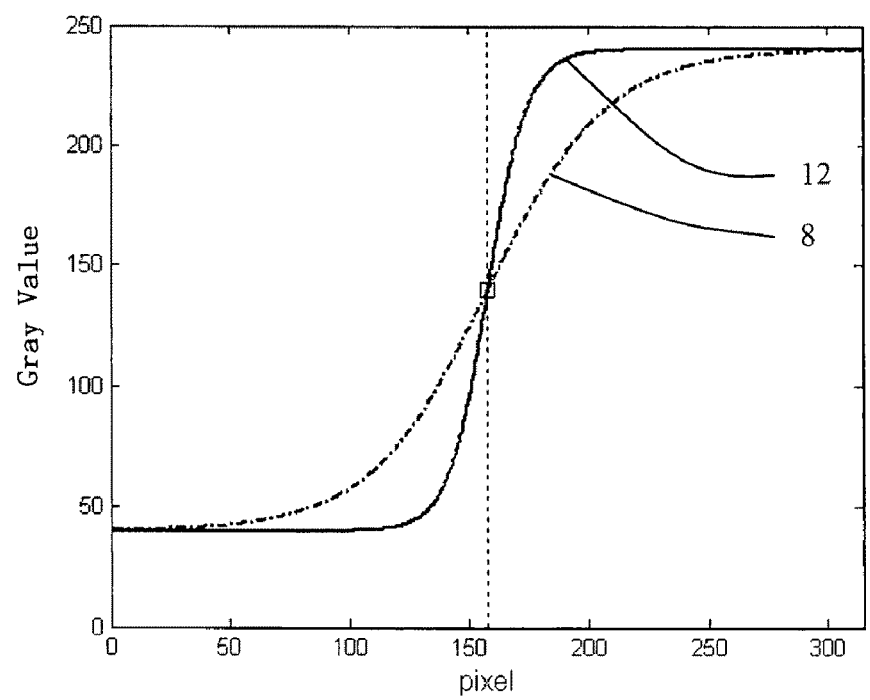
FIG. 3 is a diagram of gray value courses along an object edge after utilization of a sharpness algorithm.

A curve 12 computed with equation (1) is shown in FIG. 3 with a sharpening factor m=2. As a comparison, FIG. 3 shows a curve 8 additionally with dash-dot lines which reproduces the original curve trace with a sharpening factor m=1. This comparison shows that for the curve 12, the width of the transition from dark background (gray value 50) to bright object (gray value 230) extends approximately from the pixel values 100 to 215 so that the edge between the object and the background is only half as wide as with curve 8.

Figure 12:
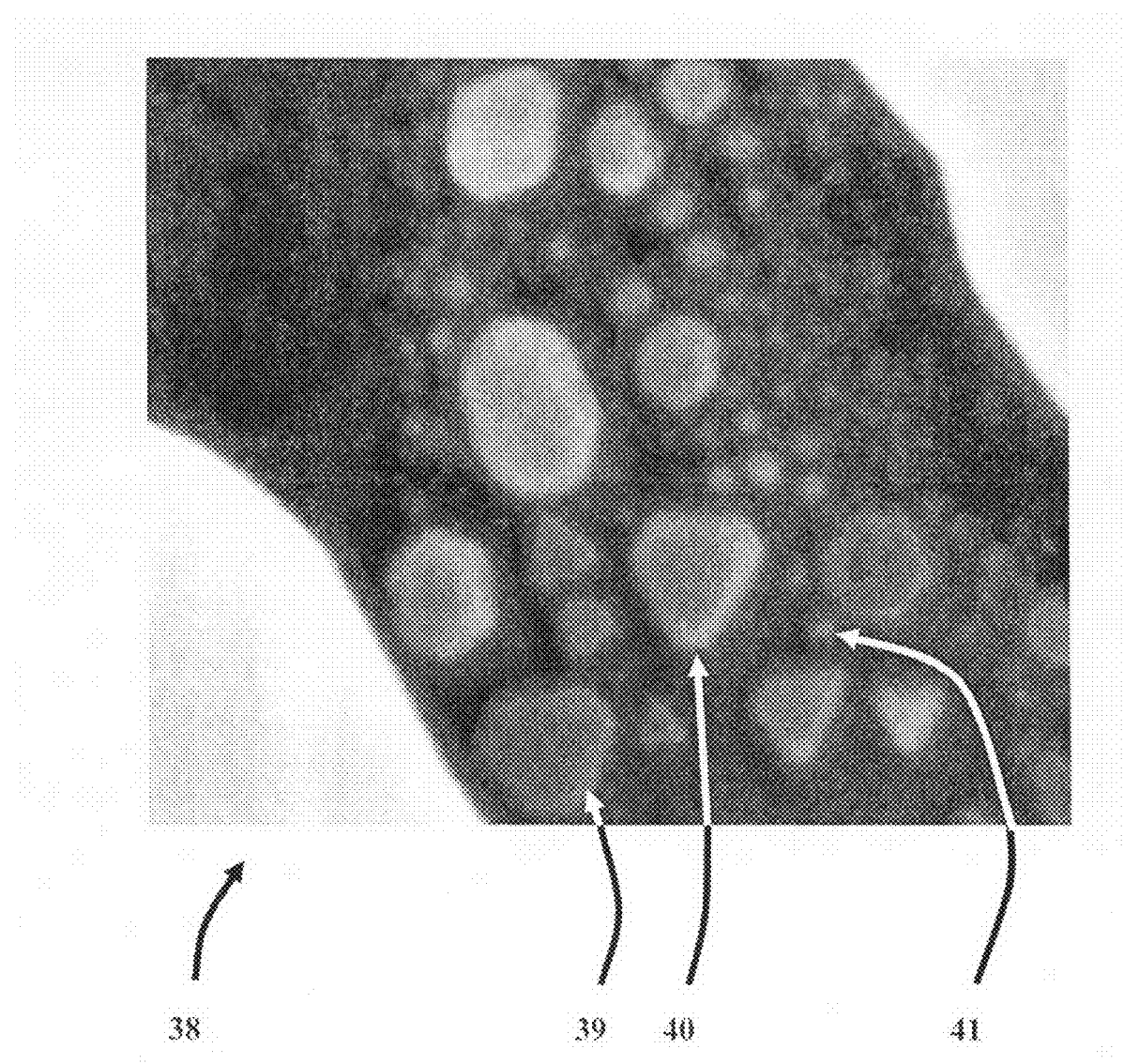
FIG. 12 is a smoothed and sharpened edge image on the basis of FIGS. 10 and 11.
Figure 13B:
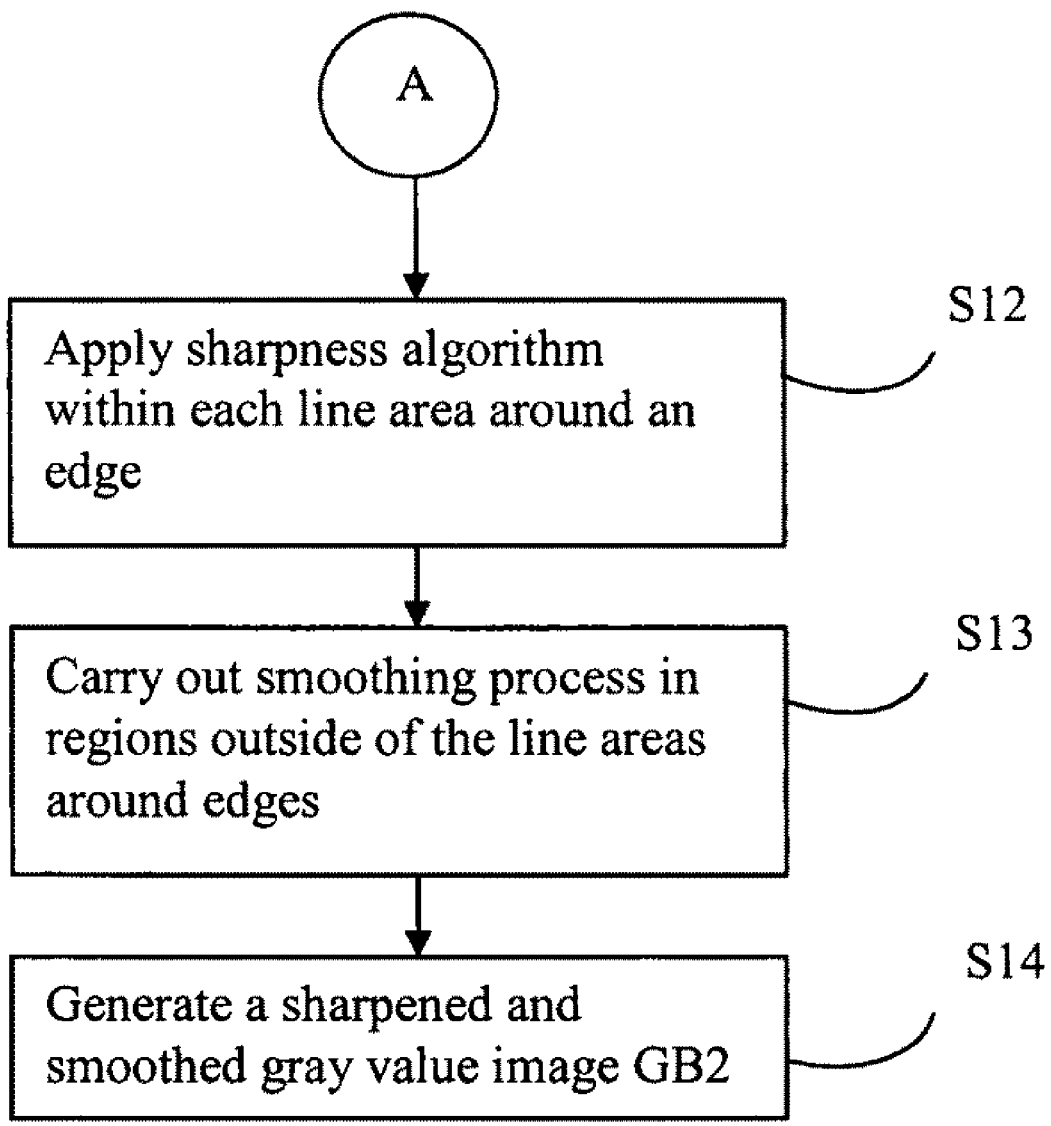
FIG. 13B is a continuation of the flow diagram of FIG. 13A.

If the curves are so sharpened, then in step S13 (see FIG. 13B), a smoothing method is carried out in areas outside of the line area around an edge. This does not affect the resolution of the sharpened image; however, it does reduce the noise component. In step S14, an image is outputted which is sharpened at the edges and smoothed in regions outside of the edges (see image 38 in FIG. 12). The objects (2, 3, 4), which are recognizable in the originally recorded gray value image 1, correspond after sharpening and noise suppression to the objects (39, 40, 41).

The method described above can be carried out after the total gray value image was recorded (offline mode). However, it is also possible to process the gray value image during its generation with the described method and to only generate a sharpened and smoothed image and to display (online mode). The latter is possible in the case when an edge filter is used which does not need the information of the entire image for edge location.

It is understood that the foregoing description is that of the preferred embodiments of the invention and that various changes and modifications may be made thereto without departing from the spirit and scope of the invention as defined in the appended claims.

What is claimed is:

1. A method for recording and displaying an image of a sample, the method comprising the steps of:
generating an electron beam;
scanning a surface of the sample with the electron beam;
detecting electrons emanating from the sample while scanning the sample with the electron beam;
generating an image of the surface of the sample based on the detected electrons and displaying the generated image as a gray value image;
generating a binary edge image from said gray value image so that edges present in said gray value image are determined as line areas around said edges;
applying a sharpness algorithm in the gray value image within regions which correspond to said line areas;
carrying out a smoothing process in the gray value image within regions which lie outside of said line areas so that an additional smoothed, sharpened gray value image is generated; and,
displaying the smoothed, sharpened gray value image.

2. The method of claim 1, wherein, with said sharpness algorithm, gray values within the areas corresponding to said line areas are computed utilizing a tangent hyperbolic function.

3. A method for processing a digital gray value image, the method comprising the steps of:
generating a binary edge image from said gray value image so that edges present in said gray value image are determined as line areas around said edges;
applying a sharpness algorithm in the gray value image within regions which correspond to said line areas;
carrying out a smoothing process in the gray value image within regions which lie outside of said line areas so that an additional smoothed, sharpened gray value image is generated;

wherein, with said sharpness algorithm, gray values within the areas corresponding to said line areas are computed utilizing a tangent hyperbolic function;

wherein a gray value matrix is computed with said sharpness algorithm utilizing the following equation:

$$If = A*\tan h(m*ar \tan h[\{I0-C\}/A]) + C,$$

wherein:
$If$=gray value matrix of the sharpened gray value image having gray values within the line areas around edges;
$I0$=gray value matrix of the unprocessed gray value image;
$A$=amplitude of a tangent hyperbolic function which indicates the gray value course in the unprocessed gray value image within the regions which correspond to the line areas around edges;
$C$=gray value at the inflection point of the tangent hyperbolic function which indicates the gray value course in the unprocessed gray value image within the regions which correspond to the line areas around edges; and,
$m$=sharpening factor.

4. The method of claim 3, wherein said binary edge image is formed utilizing a gradient image generated on the basis of said gray value image.

5. The method of claim 4, wherein said gradient image is generated utilizing a difference operator selected from the group comprising: a Sobel operator, Prewitt operator, Laplace operator, Kirsch operator and Roberts operator.

6. The method of claim 4, wherein said gray value image is subjected to a smoothing process in advance of generating said gradient image.

7. The method of claim 6, wherein said smoothing process is carried out utilizing a median filter.

8. The method of claim 4, wherein said gradient image is generated by coupling a first directional gradient image with a second directional gradient image; and said first directional gradient image is formed in that gradients in said gray value image are determined in a first direction and said second directional gradient image is formed in that gradients in said gray value image are determined in a direction perpendicular to said first direction.

9. The method of claim 4, wherein a first threshold value is assigned to said gradient image generated on the basis of said gray value image; and, gradient image points of said gradient image having a brightness magnitude above said first threshold value are set to logic 1 and gradient image points of said gradient image having a brightness magnitude less than said first threshold value are set to logic 0 so that said binary edge image is generated wherein the gradient image points set to logic 1 form line areas around edges and the gradient image points set to logic 0 form a background.

10. The method of claim 9, wherein the first threshold value is one-quarter of the maximum gradient in said gradient image.

11. The method of claim 9, wherein said binary edge image is subjected to a smoothing process and, thereafter, a second threshold value is set and image points of said gradient image having a brightness magnitude above said second threshold value are set to logic 1 and image points of said gradient image having a brightness magnitude below said second threshold value are set to logic 0; and, the edge image points, which are set to logic 1, form line areas around edges and the edge image points, which are set to logic 0, form a background in order to generate an additional binary edge image.

12. The method of claim 11, wherein said binary edge image is subjected to a smoothing process utilizing a median filter.

13. The method of claim 11, wherein said second threshold value is half of the maximum gradient in said edge image which had been subjected to a smoothing process.

* * * * *